(12) United States Patent
Dränkow et al.

(10) Patent No.: US 9,695,733 B2
(45) Date of Patent: Jul. 4, 2017

(54) HEAT EXCHANGER FOR CONTROLLING THE TEMPERATURE OF A FIRST FLUID USING A SECOND FLUID

(71) Applicant: BEHR GMBH & CO. KG, Stuttgart (DE)

(72) Inventors: Andreas Dränkow, Heimsheim (DE); Franco Ghiani, Bietigheim-Bissingen (DE); Spasoje Ignjatovic, Illingen (DE); Ulrich Maucher, Korntal-Münchingen (DE); Jens Richter, Großbottwar (DE); Mark Schienemann, Remseck (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 238 days.

(21) Appl. No.: 14/403,219

(22) PCT Filed: May 23, 2013

(86) PCT No.: PCT/EP2013/060610
§ 371 (c)(1),
(2) Date: Nov. 24, 2014

(87) PCT Pub. No.: WO2013/174914
PCT Pub. Date: Nov. 28, 2013

(65) Prior Publication Data
US 2015/0107810 A1     Apr. 23, 2015

(30) Foreign Application Priority Data
May 24, 2012   (DE) .................. 10 2012 208 771

(51) Int. Cl.
*F28F 9/02*     (2006.01)
*F01P 3/12*     (2006.01)
(Continued)

(52) U.S. Cl.
CPC .............. *F01P 3/12* (2013.01); *B23P 15/26* (2013.01); *F28F 9/0219* (2013.01);
(Continued)

(58) Field of Classification Search
CPC ........ F28D 7/163; F28F 9/0219; F28F 9/0226
(Continued)

(56) References Cited

U.S. PATENT DOCUMENTS 3,377,087 A  *  4/1968  Samerdyke et al. ...... F16L 7/02
165/158
3,768,550 A  *  10/1973  Williamson ............... F28F 9/00
165/158

(Continued)

FOREIGN PATENT DOCUMENTS

DE    1 812 560 A1    6/1970
DE    34 35 093 A1    4/1986
(Continued)

OTHER PUBLICATIONS

International Search Report, PCT/EP2013/060610, Sep. 3, 2013, 3 pgs.
(Continued)

*Primary Examiner* — Allen Flanigan
(74) *Attorney, Agent, or Firm* — Paul D. Strain, Esq.; Strain & Strain PLLC (57) ABSTRACT

The present invention relates to a heat exchanger for controlling the temperature of a first fluid using a second fluid, wherein the heat exchanger has a base for separating the first fluid from the second fluid, said base having a sealing region. Furthermore, the heat exchanger has a partition for separating the first fluid from the second fluid, wherein the at least one partition is connected in a fluid-tight manner to the base, wherein the at least one partition forms a fluid duct for the first fluid. Furthermore, the heat exchanger has a
(Continued)

housing. In the sealing region between the base and the housing, there is arranged a sealing element which is pressed in a fluid-tight manner against the base and against the housing.

20 Claims, 9 Drawing Sheets

(51) Int. Cl.
    *B23P 15/26*     (2006.01)
    *F28D 7/16*     (2006.01)
    *F28D 21/00*     (2006.01)

(52) U.S. Cl.
    CPC ............ *F28F 9/0226* (2013.01); *F28D 7/163* (2013.01); *F28D 2021/0082* (2013.01); *Y10T 29/49364* (2015.01)

(58) Field of Classification Search
    USPC .................................................. 165/70, 158
    See application file for complete search history.

(56) References Cited

U.S. PATENT DOCUMENTS

| | | | | |
|---|---|---|---|---|
| 3,948,315 A * | 4/1976 | Powell | ...................... | F28D 7/06 165/143 |
| 4,557,322 A * | 12/1985 | Nipple | ...................... | F28D 7/06 165/154 |
| 4,653,575 A * | 3/1987 | Courchesne | ............ | F24F 13/30 165/135 |
| 2007/0056720 A1 * | 3/2007 | Demuth et al. | ........ | F28F 9/0278 165/158 |
| 2007/0131401 A1 * | 6/2007 | Daly et al. | .......... | B29C 65/1635 165/158 |
| 2008/0202724 A1 * | 8/2008 | Lorenz et al. | ........ | F28D 7/0075 165/51 |
| 2008/0289804 A1 * | 11/2008 | Baumann et al. | .... | F28D 7/1692 165/157 |
| 2009/0008074 A1 | 1/2009 | Vamvakitis | | |
| 2009/0056922 A1 * | 3/2009 | Hemminger et al. | .... | F28F 9/02 165/158 |
| 2010/0025023 A1 | 2/2010 | Schmidt et al. | | |
| 2012/0285423 A1 | 11/2012 | Nguyen | | |

FOREIGN PATENT DOCUMENTS

| | | | |
|---|---|---|---|
| DE | 697 03 167 T2 | 1/2001 | |
| DE | 10 2006 040 851 A1 | 3/2008 | |
| DE | 10 2008 007 073 A1 | 8/2008 | |
| DE | 10 2009 055 715 A1 | 6/2011 | |
| GB | 2164738 A * | 3/1986 | ................ F28F 9/02 |
| JP | H11-324686 A | 11/1999 | |
| JP | 2006-513393 A | 4/2006 | |
| JP | 2012-021560 A | 2/2012 | |
| WO | WO 2006/090626 A1 | 8/2006 | |
| WO | WO 2008/125485 A1 | 10/2008 | |

OTHER PUBLICATIONS

German Search Report, DE 10 2012 208 771.0, Mar. 18, 2013, 5 pgs.

* cited by examiner

HEAT EXCHANGER FOR CONTROLLING THE TEMPERATURE OF A FIRST FLUID USING A SECOND FLUID

CROSS-REFERENCE TO RELATED PATENT APPLICATIONS

This application is a National Stage of International Application No. PCT/EP2013/060610, filed May 23, 2013, which is based upon and claims the benefit of priority from prior German Patent Application No. 10 2012 208 771.0, filed May 24, 2012, the entire contents of all of which are incorporated herein by reference in their entirety.

The present invention relates to a heat exchanger for controlling the temperature of a first fluid using a second fluid, and to a method for producing a heat exchanger for controlling the temperature of a first fluid using a second fluid in accordance with the main claims.

Owing to bottlenecks in the installation space in the front of vehicles and advantages in response behavior and dynamic performance, indirect charge air cooling is becoming increasingly popular. Current tube bundle systems are very expensive owing to aluminum water boxes embodied as deep drawn parts and owing to a sheet which is three to four mm thick and punched out by virtue of its design. In addition, charge air coolers are made more expensive by a very complex encasement and soldering process. A high mass and shielding due to the closed construction with covers leads to long soldering times. Moreover, high investment costs arise through the encasement devices and closing devices for the production of such heat exchangers.

DE 10 2006 040851 A1 shows an indirect charge air cooler having a tube assembly molded into a plastic housing.

It is the object of the present invention to provide an improved heat exchanger for controlling the temperature of a first fluid using a second fluid and an improved method for producing a heat exchanger of this kind.

This object is achieved in accordance with the main claims by a heat exchanger for controlling the temperature of a first fluid using a second fluid and by a method for producing a heat exchanger for controlling the temperature of a first fluid using a second fluid.

The present invention is based on the insight that a tube bundle can be pressed in a fluidtight manner into a heat exchanger housing in order to provide a heat exchanger which is easier to produce. Separate production of the tube bundle leads to easier access for subsequent work on the soldered tube assembly. As a result, it is also easier to check soldering quality, in contrast to the current design. Improved suitability for process monitoring can lead to lower production costs through avoidance of rejects. Tool costs can be reduced through easier production. No expensive production plants are required. Encasement devices can be omitted since the tube assembly is encased in a frame which is simultaneously embodied as a soldering fixture. Through replacing a mechanical connection, such as a corrugated slot bead, by a method involving a material joint, it is also possible to eliminate closing devices. The heat exchanger can be produced more easily and more quickly and can be embodied with a lower weight.

The present invention provides a heat exchanger for controlling the temperature of a first fluid using a second fluid, wherein the heat exchanger has the following features:

a sheet for separating the first fluid from the second fluid, said sheet comprising a sealing region;

a partition for separating the first fluid from the second fluid, wherein the at least one partition is connected in a fluidtight manner to the sheet, wherein the at least one partition forms a fluid duct for the first fluid; and a housing, which is pressed in a fluidtight manner against the sheet in the sealing region.

The present invention furthermore provides a method for producing a heat exchanger for controlling the temperature of a first fluid using a second fluid, wherein the method has the following steps:

supplying a heat transfer unit having at least one sheet for separating the first fluid from the second fluid, said sheet comprising a sealing region, and having a partition for separating the first fluid from the second fluid, wherein the at least one partition has been connected in a fluidtight manner to the sheet in a preceding connecting step, wherein the at least one partition forms a fluid duct for the first fluid;

supplying a housing for surrounding the heat transfer unit, wherein the housing has an interface for receiving the sealing region;

arranging the sealing region in the interface, wherein the heat transfer unit is arranged in the housing;

pressing the housing against the sheet in order to connect the sheet in a fluidtight manner to the housing in the sealing region.

A heat exchanger can be taken to mean a shell and tube heat transfer unit. A sheet can be a plate-shaped component with through holes which is designed to receive at least one tubular component and to be connected thereto in a fluidtight manner. The sheet can be a tube sheet, for example. A sealing region can be arranged along the outer contour of the sheet. The sealing region of the sheet can comprise at least one sealing surface, which is designed to be pressed against another component in a fluidtight manner. A partition can be taken to be a heat transfer surface of the heat exchanger which is designed to transfer heat from the first fluid to the second fluid when the fluids are at different temperatures. For example, the partition can be embodied as a tube or flat tube for the first fluid. The partition can also be embodied as a plate. The housing can be made of plastic, for example. The housing can have a first connection for conveying the second fluid and at least one second connection for conveying the second fluid. In this way, the second fluid can be conveyed through the heat exchanger in order to control the temperature of the first fluid. The first and second connection can be arranged on the side of the sheet on which the partition is arranged. By pressing the housing against the sheet, it is possible to achieve a contact pressure which connects the sheet to the sheet in a fluidtight manner. By pressing a seal between the sheet and the housing, the first fluid duct can be separated from the second fluid duct. An interface can be taken to mean a receiving device which is designed to at least partially receive the sealing region of the sheet in order to enable the sheet to be pressed against the housing in a fluidtight manner.

Furthermore, the sheet and the housing can each have, in the sealing region, at least one guide surface for positive connection of the housing to the sheet. A guide surface can be taken to mean a surface which is designed to guide the sheet in a direction of contact pressure of the sheet and/or to align it transversely to the direction of contact pressure on the housing, that the sheet is arranged with positive engagement on the housing in the pressed-on state. As a result, the sheet can better withstand a pressure on the sheet and can be anchored more securely at a defined position in the housing.

The heat exchanger can furthermore have a sealing element, which is arranged in the sealing region between the sheet and the housing, wherein the sealing element is pressed in a fluidtight manner against the sheet and against the housing. A sealing element can be taken to mean a component which comprises a flexible and/or adhesive material. The sealing element can compensate for dimensional tolerances between the sheet and the housing and ensure reliable sealing of the sheet on the housing.

The sealing element can furthermore have at least one leakage opening for collecting and discharging leakage fluid. A leakage opening can be taken to mean a through hole. Moreover, the housing can have a leakage duct for collecting and discharging leakage fluid in the sealing region. A leakage duct can be taken to mean a recess which extends at least partially around the housing and is designed to carry first fluid that has entered and/or second fluid that has entered in the sealing region. The leakage duct can likewise be a connection to an external environment of the heat exchanger. This enables fluids which have entered to emerge from the sealing region into the external environment. The sheet can furthermore have a drainage device for collecting and discharging leakage fluid in the sealing region. A drainage device can be taken to mean a duct which is designed to collect the first and/or the second fluid before the first and/or the second fluid undermines the sealing region. It is thereby possible to ensure separation of the first fluid from the second fluid and vice versa since the leakage opening and/or the leakage duct and/or the drainage device prevent/s the first fluid from being mixed with the second fluid and prevent/s the second fluid from being mixed with the first fluid.

Moreover, the leakage opening and the leakage duct can be designed to carry away leakage fluid from the leakage opening through the leakage duct. The leakage opening and the leakage duct can be aligned with one another and can be in contact with one another in order to carry away fluid that has entered. Such an embodiment of the present invention offers the advantage of a common discharge possibility for fluid through the leakage channel, with the result that only a small number of outflow openings have to be allowed for the leakage fluid.

Moreover, the leakage opening and the drainage device can be designed to carry away leakage fluid from the drainage device through the leakage opening. The drainage device and the leakage opening can be aligned with one another and can be in contact with one another in order to carry away fluid that has entered. Such an embodiment of the present invention likewise offers the advantage of a common discharge possibility for fluid through the leakage opening, with the result that only a small number of outflow openings have to be allowed for the leakage fluid.

The housing can furthermore have reinforcing ribs. As a result, the housing can be made thinner, which can lead to a reduction in weight. In addition, the consumption of materials can be reduced. Or the housing can withstand a higher pressure if the wall thickness remains the same.

The housing can furthermore have a diffuser and/or a nozzle, wherein the diffuser widens an inflow cross-sectional area of an inflow duct to a cross-sectional area of the fluid duct, and the nozzle reduces the cross-sectional area of the fluid duct to an outflow cross-sectional area of an outflow duct. It is thereby possible to avoid flow losses in the fluid duct since a flow velocity can be reduced. After the fluid duct, the flow velocity can be increased again.

The housing can furthermore have a device for receiving a connection component. A device for receiving a connection component can be a groove designed to connect the connection component in a fluidtight manner to the sheet, for example. As a result, the first fluid can be passed exclusively over metallic surfaces, which are not sensitive to heat if the partition has a metallic surface and the sheet has a metallic surface.

The heat exchanger can furthermore have another sheet for separating the first fluid from the second fluid, with another sealing region, wherein the further sealing region is connected to the partition and to the housing in a fluidtight manner, wherein the housing is pressed against the further sheet in the further sealing region, and wherein the further sheet, the partition, the housing and the sheet form a further fluid duct for the second fluid. As a result, the second fluid can control the temperature of the first fluid through the partition and can flow through the heat exchanger while being separated from the first fluid. As a result, the heat exchanger can be integrated in a simple manner as a complete component into an existing fluid line.

Advantageous illustrative embodiments of the present invention are explained in greater detail below with reference to the attached drawings, in which.

In the following description of the preferred illustrative embodiments of the present invention, identical or similar reference signs are used for the similarly acting elements illustrated in the various drawings, while repeated description of these elements is omitted.

Figure 1:
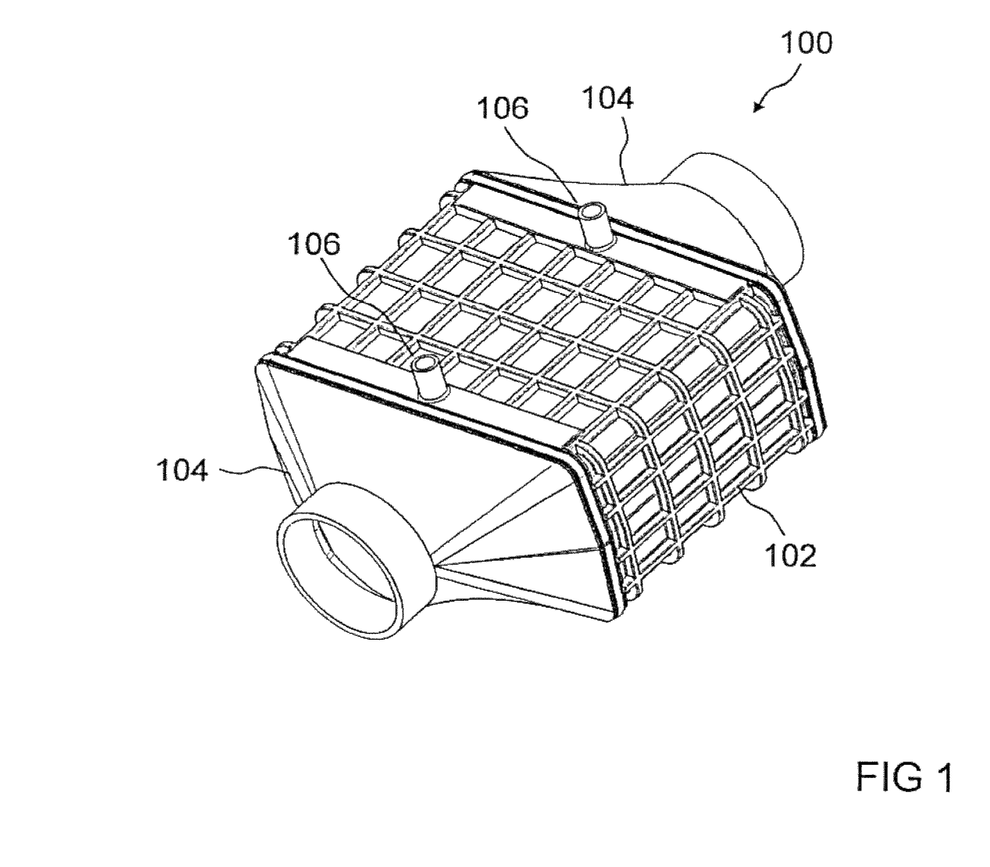
FIG. 1 shows a three dimensional depiction of a heat exchanger according to one illustrative embodiment of the present invention.

FIG. 1 shows a three dimensional depiction of a low-cost indirect charge air cooler 100 in a housing 102. Various illustrative embodiments of the invention, presented here, of a low-cost indirect charge air cooler 100 of tube construction have a plastic housing 102 or cast aluminum housing 102. As a result, a significantly cheaper tube bundle system that is easier to manufacture can be formed, which can be embodied as an add-on solution or as an integral part of the intake pipe. In the approach presented here, aluminum boxes, aluminum covers and a thick sheet are eliminated. The sheet is replaced by a thin sheet that can be produced easily and cheaply or is eliminated completely. The heat exchanger 100 depicted here for charge air cooling with liquid coolant has two funnel-shaped air boxes 104 appended to the housing 102. The air boxes 104 widen a round cross section of an air duct to the rectangular cross section of the heat exchanger 100. The housing 102 has reinforcing ribs in the longitudinal and transverse directions of the heat exchanger 100. The reinforcing ribs have a grid-type form. Two connections 106 for the coolant are depicted on a flat side of the housing 102. The connections 106 each have a water box for distributing the coolant in the heat exchanger 100. The water boxes extend over a width of the heat exchanger 100. The housing 102 comprises a top part and a bottom part, which have been connected after insertion of the tube bundle system into the heat exchanger 100.

Figure 2:
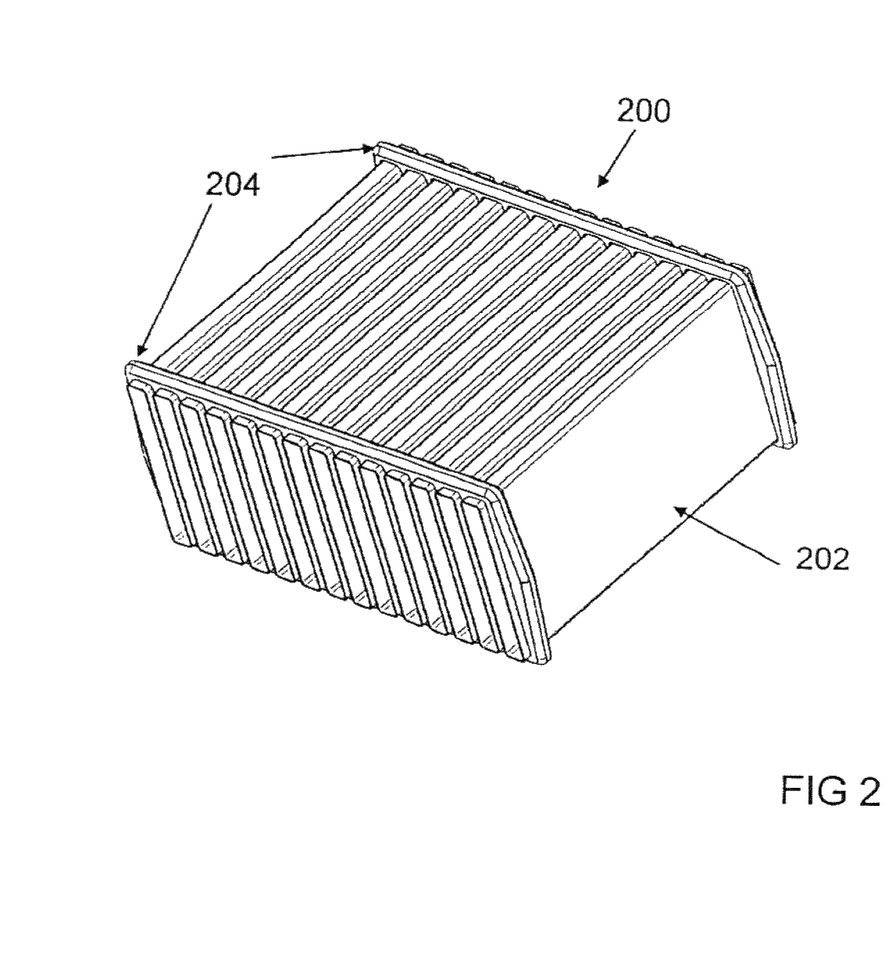
FIG. 2 shows a three dimensional depiction of a heat transfer unit according to one illustrative embodiment of the present invention.

FIG. 2 shows a three dimensional depiction of a heat transfer unit matrix 200, consisting of tubes 202, ribs and sheets 204. The heat transfer unit matrix 200 is manufactured from aluminum and soldered. The housing is placed around the heat transfer unit matrix 200 in a second step and can be manufactured from plastic or from a metallic material. The heat transfer unit matrix 200 is intended for at least two fluids. It consists of tubes 202, ribs and two sheets 204. The heat transfer unit 200 is surrounded by a jacket embodied as a single part or a plurality of parts. Here, the fluids are separated by a sealing element between the sheet 204 and the housing. The tubes 202 are embodied as flat tubes. Between the tubes 202 there is an interspace for the coolant. The tubes 202 pass through the sheets 204 and are connected in a fluidtight manner to the sheets 204. The sheets 204 have two peripheral chamfers. For insertion into the housing, the sheets 204 have tapers on narrow sides of the sheets 204.

FIGS. 3a, 3b, 3c, 3d and 3e show a side view, a plan view, a longitudinal section, a cross section and a section in a main plane of extent of a heat exchanger 100 according to one illustrative embodiment of the present invention. The charge air boxes 104 and coolant jacket 102 surround a soldered rib-tube assembly 200 with positive engagement. The charge air boxes 104 and the coolant jacket 102 are preferably composed of plastic. In principle, a metal version of the housing would also be conceivable, e.g. in the form of a casting. The housing 102 can be in two parts but can also consist of a plurality of parts. On the one hand, the housing 102 can be embodied in such a way that the cooler 200 can be inserted separately, as an add-on, or, on the other hand, it can be embodied as an intake pipe and can be capable of being secured directly on the engine. In order to achieve positive engagement between the housing parts and sealing between the fluids, a sealing element can seal off the fluids axially or radially from one another. The sealing element can be a separate component. Individual parts of the plastic housing 102 can be connected by a welding or adhesive bonding process. The plastic parts of the housing can be connected to the tube assembly 200 by way of a groove/ sealing joint, including a mechanical joint, such as a corrugated-slot bead. The plastic parts can also be screwed. Where a separate seal is dispensed with, the sheet 204 can be overmolded directly with plastic. The seal can be made perforated at the circumference. If there is a leak between the sheet 204 and the seal, the fluid from the leaking side can be passed to the outside through a perforation opening in the seal via the opening in the annular duct of the housing 102. There is no mixing of the fluids. Predetermined leakage can be provided in the housing 102 between the two sealing surfaces. The charge air connections 104 can be embodied as stubs or can have a flange connection, which is screwed to the engine for example. Coolant connections 102 can be molded directly into the plastic housing 102. The covering 102 can be adhesively bonded to the heat transfer unit matrix 200 to increase strength. The cover 102 can be embodied with reinforcing beads. Additional reinforcements, such as molded-in reinforcements made of metal or elements surrounding the housing 102 can increase strength levels. A clearance angle on the cover 102 in the region of the sheet 204 and/or the seal allows friction-free insertion of the heat transfer unit matrix 200 and of the seal into the housing 102 until the seal is pressed down. Two mutually independent sealing surfaces separate the two fluids in the sheet 204. A gap between the housing 102 and the tube broad side can be embodied as a further coolant duct. The coolant is connected via the housing 102 and can be discharged in a flexible manner in the region of the heat transfer unit matrix 200 through ducting of suitable design. The heat transfer unit matrix 200 consists of tubes 202 and ribs, with or without sheets 204. The charge air is carried in the tubes 202. In the case of the coolant block 200, it is possible to dispense completely with the sheet 204, and a soldered tube-rib assembly 200 can be inserted into the housing 102. By means of the housing 102, a separation is ensured between the charge-air and the coolant side since the housing 102 has openings for the tubes 202 and can thus form an alternative sheet.

Figure 3A:
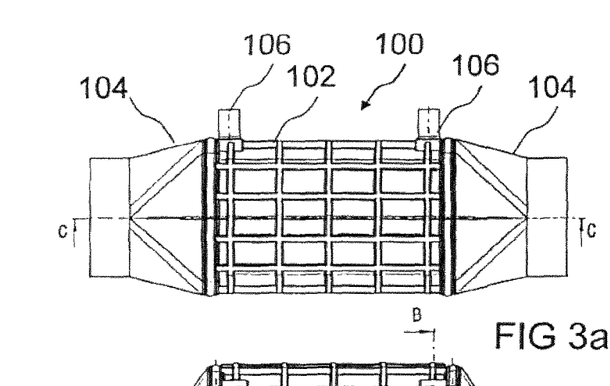
FIGS. 3a, 3b, 3c, 3d and 3e show depictions of various views and sections of a heat exchanger according to one illustrative embodiment of the present invention.

FIG. 3a shows a side view of a heat exchanger 100 with a rib housing 102 and adjoining air boxes 104. Two connections 106 for coolant are depicted at the top in the side view.

Figure 3B:
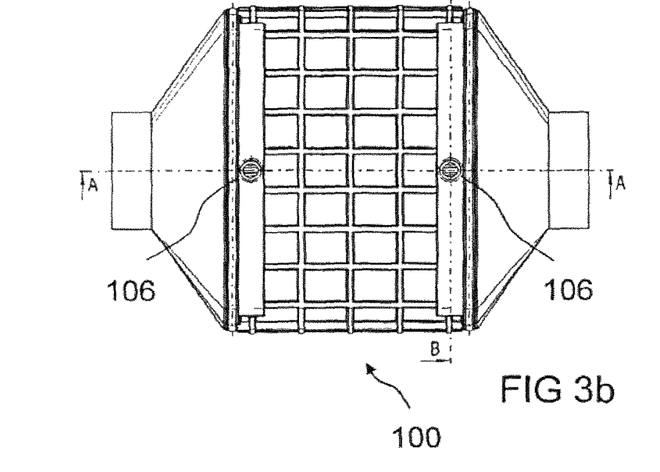

FIG. 3b shows a plan view of the heat exchanger 100. The connections 106 for coolant are arranged in a center plane of the heat exchanger 100. Water boxes extend away from the connections 106 perpendicularly to the center plane as far as an edge of the heat exchanger 100.

Figure 3C:
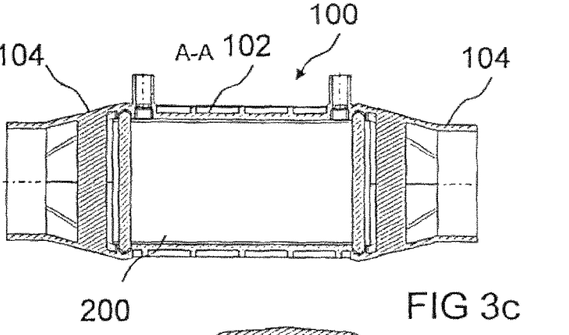

FIG. 3c shows a longitudinal section through the heat exchanger 100 along a section line A-A in the center plane, as illustrated in FIG. 3b. The inserted heat transfer unit 200 is surrounded by the housing 102 of the heat exchanger 100. A reinforcing rib is depicted in section in the air boxes 104. The reinforcing rib is arranged in the longitudinal direction, which is favorable in terms of flow.

Figure 3D:
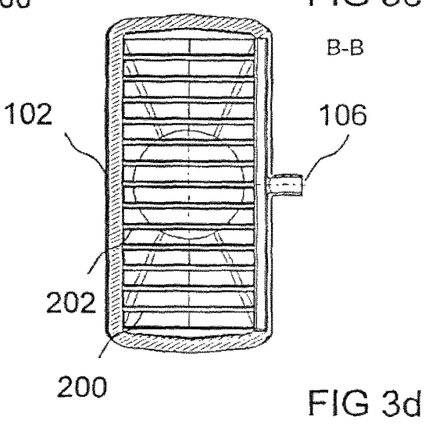

FIG. 3d shows a cross section through the cooler block 200 along a section line B-B, perpendicularly to the center plane. The section passes through the connection 106 for coolant and the adjoining water box. There is an interspace between the tubes 202, through which the coolant can flow from one connection 106 to the other connection 106. The housing 102 is made up of two halves. Each half has removal tapers. The sheets follow this contour in order to seal off the coolant from the charge air.

Figure 3E:
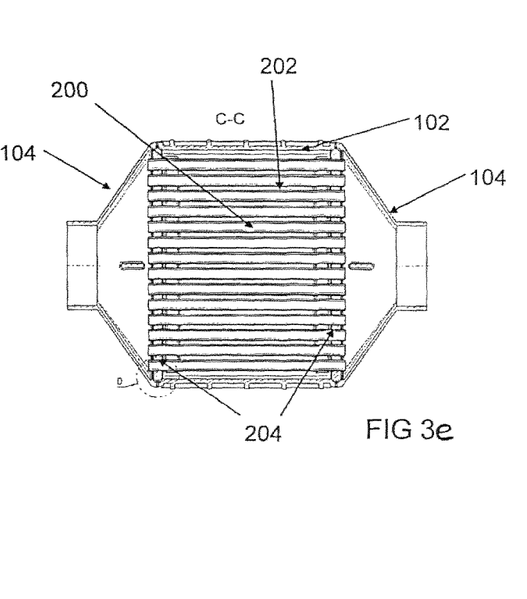

FIG. 3e shows a section along a section line C-C, which is depicted in FIG. 3a. The heat transfer unit matrix 200 is inserted with two sheets 204 into a groove in the housing 102. The tubes 202 of the heat transfer unit matrix 200 are designed to carry charge air from one air box 104 to the other air box 104. Between the sheets 204 there is a fluidtightly sealed cavity for coolant, through which the tubes 202 pass. The coolant can absorb heat from the charge air flowing through the tubes 202.

Figure 4:
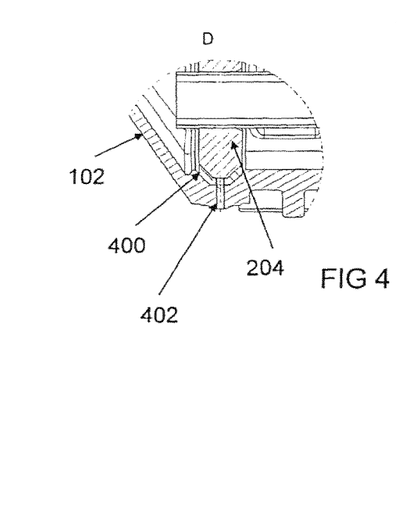
FIG. 4 shows a detail of a sealing region according to one illustrative embodiment of the present invention.

FIG. 4 shows a detail D from FIG. 3e. It shows a sealing region between the sheet 204 and the housing 102 according to one illustrative embodiment of the present invention. A sealing element 400 is arranged between the sheet 204 and the housing 102. The sheet 204 has two peripheral chamfers in the sealing region. The housing 102 has a peripheral groove in the sealing region. The sealing element 400 is arranged in the groove. The sealing element 400 is squeezed between the housing 102 and the sheet 204. The sealing element 400 is thereby pressed in a fluidtight manner both against the sheet 204 and also against the housing 102. If coolant or charge air nevertheless gets between the seal 400 and the sheet 204 during operation, the sealing element 400 has a leakage opening 402 as a predetermined leakage point, through which the fluid can be carried away to a leakage opening 402 in the housing 102. The housing 102 additionally has a peripheral drainage duct, which can carry away coolant or charge air to the leakage opening 402 if coolant or charge air gets between the housing 102 and the sealing element 400. It is thereby possible to ensure that the charge air is not contaminated with coolant. It is likewise possible to ensure that the coolant is not contaminated with charge air. By means of the groove in the housing 102 and the two peripheral chamfers on the sheet 204, the sheet 204 is connected positively to the housing 102. It is thereby possible for the sheet to withstand pressure from the coolant and the charge air.

Figure 5A:
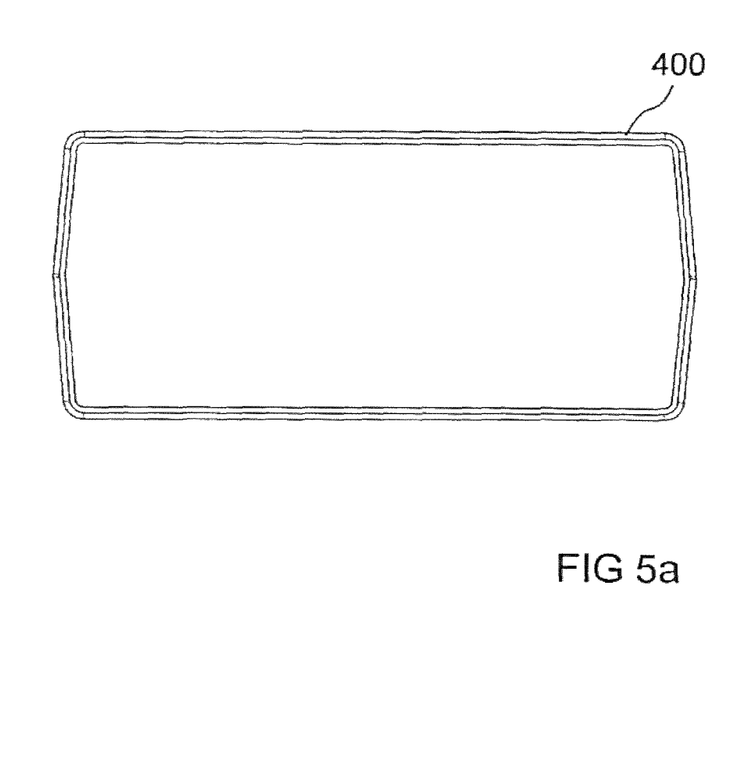
FIGS. 5a and 5b show depictions of a sealing element according to one illustrative embodiment of the present invention.

FIG. 5*a* shows a front view of the sealing element according to one illustrative embodiment of the present invention. The sealing element 400 is embodied as a closed ring for surrounding a sheet of a heat transfer unit. An inner contour of the sealing element 400 mirrors an outer contour of the sheet. An outer contour of the sealing element 400 mirrors an inner contour of a housing. On long sides, the sealing element 400 has straight sections. In the depiction, the straight sections are at the top and bottom. On short sides, the sealing element 400 has sloping sections. The sloping sections follow the molded tapers for insertion on the sheet and the housing.

Figure 5B:
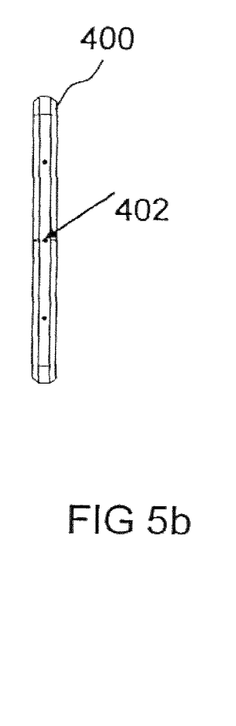

FIG. 5*b* shows a side view of the sealing element 400 from FIG. 5*a*. At a meeting point of the sloping sections, the sealing element 400 has a leakage opening 402 for discharging leakage fluid.

Figure 6:
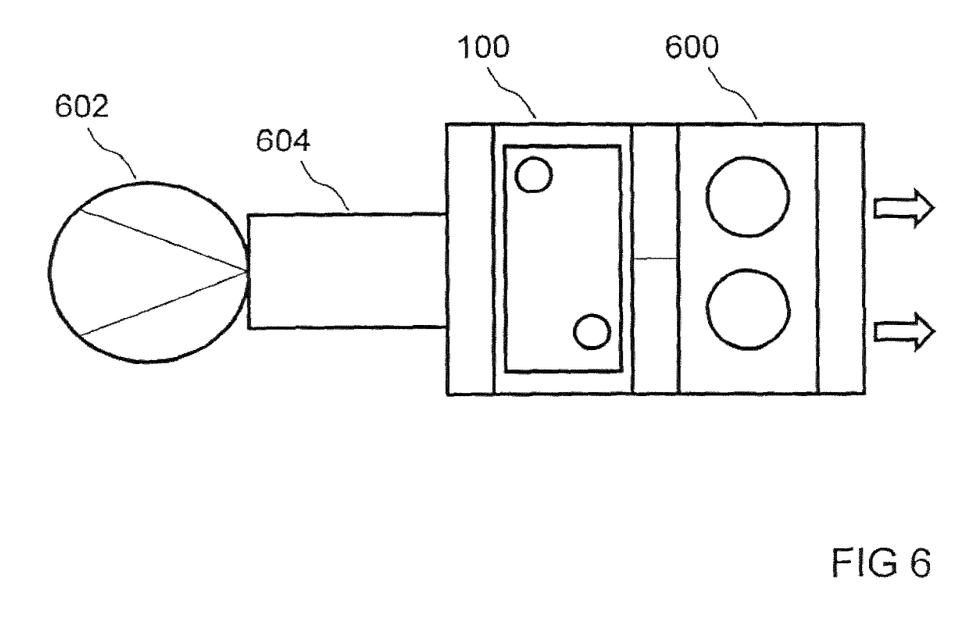
FIG. 6 shows a block diagram of an intake section with a heat exchanger according to one illustrative embodiment of the present invention.

FIG. 6 shows a block diagram of an intake section of an internal combustion engine 600 with a charge air cooler 100 according to an illustrative embodiment of the present invention. The charge air is supplied by a turbocharger 602. From the turbocharger 602, the charge air passes through an intake pipe 604 to the internal combustion engine 600. The charge air cooler 100 is arranged in the intake pipe 604. The intake pipe is an extension of the charge air cooler 100. The charge air, which has been compressed in the turbocharger 602 and heated in the process, flows through the charge air cooler 100. In the charge air cooler 100, the charge air is cooled. During this process, a density of the charge air increases. As a result, a larger quantity of air is available for combustion in the internal combustion engine 600 during a piston stroke than if the charge air were not cooled. The charge air cooler 100 is an indirect charge air cooler 100. The coolant or cooling water transfers the heat out of the heated charge air. Owing to the large heat capacity of the coolant, the charge air cooler can be of small construction, and therefore the intake section can be kept short in order to achieve an improved response from the turbocharger 602.

Figure 7A:
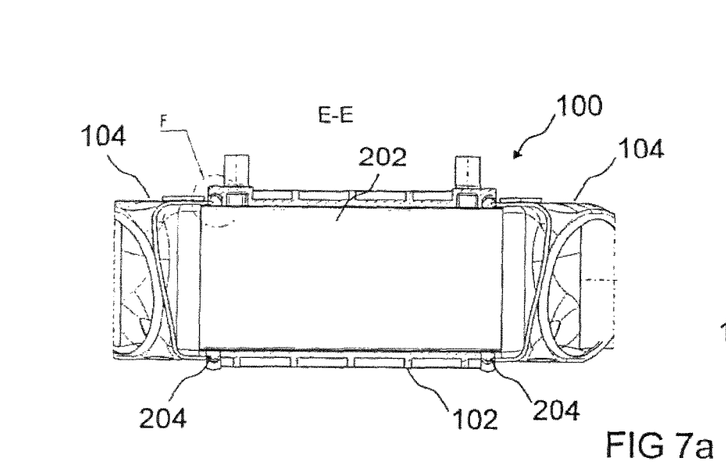
FIGS. 7a and 7b show depictions of a heat exchanger integrated into an intake pipe according to one illustrative embodiment of the present invention.
Figure 7B:
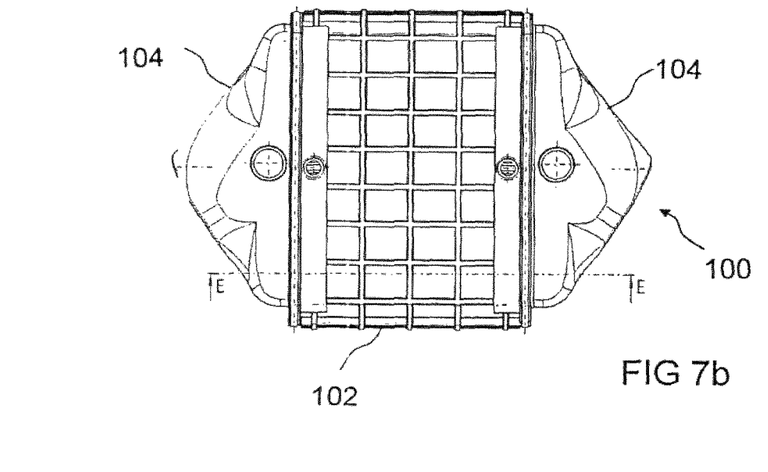

FIGS. 7*a* and 7*b* show a plan view and a section through an indirect charge air cooler 100 according to one illustrative embodiment of the present invention, which is integrated directly into an intake pipe. The intake pipe merges directly into the housing 102 of the charge air cooler 100. The charge air cooler 100 has a plastic housing 102 as a coolant jacket. Adjoining air boxes 104 are soldered. The charge air cooler 100 can also be embodied as an indirect charge air cooler 100 of disk-type construction. The housing 102 can also be made from cast aluminum. The sheet 204 is embodied with a groove at the end, in which an air box 104 is soldered. The plastic housing 102 then closes off only the coolant duct. As a result, no mixing of the fluids is possible and no plastic is used on the hot charge-air side. In the embodiment shown here, the charge air cooler 100 is significantly cheaper than a charge air cooler according to the prior art. The charge air cooler 100 can be made even cheaper by dispensing with one sheet. By virtue of small dimensions, there is the possibility of embodying the charge air cooler 100 and the housing 102 as the intake pipe and thus of implementing the indirect charge air cooler 100 directly in the intake pipe. This enables the intake pipe to be made short, leading to a smaller space requirement for the engine.

FIG. 7*a* shows a section through the charge air cooler 100 along a section line E-E, which is depicted in FIG. 7*b*. The tubes 202 pass through the sheets 204 and carry the charge air from one air box 104 to the other air box 104. All parts of the charge air cooler 100 which are in contact with the charge air are made of metal.

FIG. 7*b* shows a plan view of the charge air cooler 100. The soldered air boxes 104 carry the charge air to the charge air cooler 100 and from the charge air cooler 100 obliquely to a center line of the charge air cooler 100. The charge air cooler 100 forms an insert into the intake pipe. The housing 102 has reinforcing beads.

Figure 8:
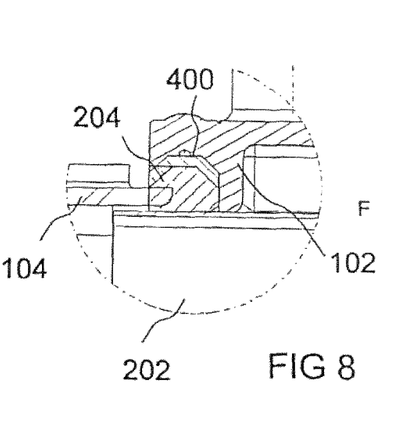
FIG. 8 shows a detail of a sealing region according to one illustrative embodiment of the present invention with a directly connected air box.

FIG. 8 shows a detail F from FIG. 7*a*. The tube 202 passes through the sheet 204 perpendicularly to a main plane of extent of the sheet 204 and is connected in a fluidtight manner to the sheet 204. The sheet 204 has a double chamfer at one edge. The sheet 204 has a groove perpendicular to the main plane of extent. The air box 104 is inserted as a connection component into the groove and positively connected. The housing 102 likewise has a groove. The sheet 204 is arranged in the groove in the housing 102. A sealing element 400 is arranged between the sheet 204 and the housing 102. The sheet 204 is pressed into the groove in the housing 102. The groove in the housing 102 has a drainage device in order to drain leakage fluid from a seal region.

Figure 9:
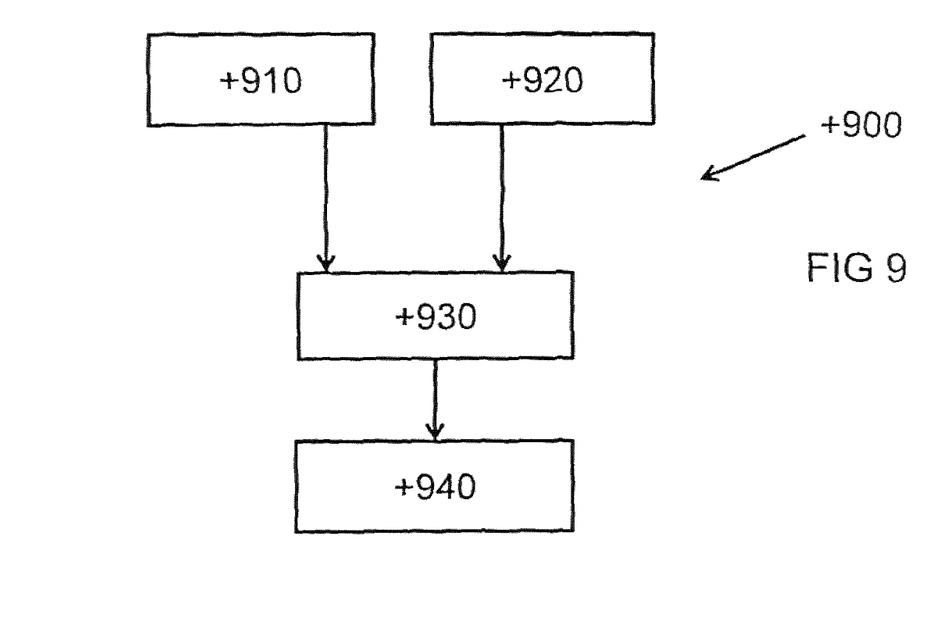
FIG. 9 shows a flow diagram of one illustrative embodiment of the present invention as a method.
Figure 10:
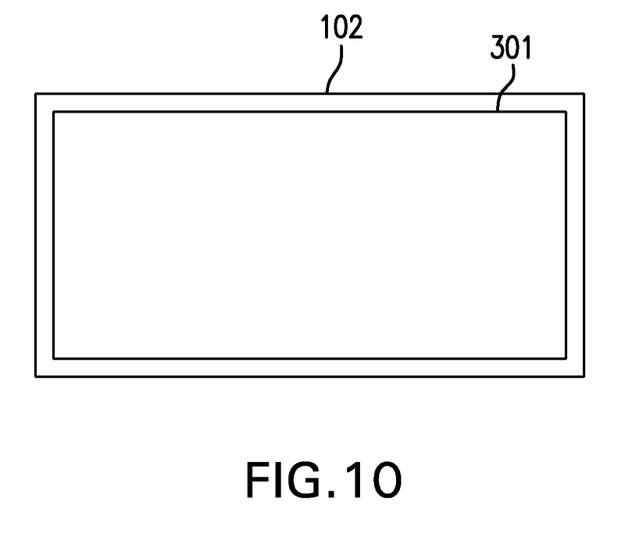
FIG. 10 shows a block diagram of an embodiment of the subject matter of the present application, including the drainage device 301. The block diagram of FIG. 10 is not intended to show structural features such as relative size, orientation, and spacing.

FIG. 9 shows a flow diagram of one illustrative embodiment of the present invention as a method 900 for producing a heat exchanger 100 for controlling the temperature of a first fluid using a second fluid. The method 900 comprises a step of supplying 910 a heat transfer unit 200 having at least one sheet 204 for separating the first fluid from the second fluid, said sheet comprising a sealing region, and having a partition 202 for separating the first fluid from the second fluid, wherein the at least one partition 202 has been connected in a fluidtight manner to the sheet 204 in a preceding connecting step, wherein the at least one partition 202 forms a fluid duct for the first fluid. The method furthermore comprises a step of supplying 920 a housing 102 for surrounding the heat transfer unit 200, wherein the housing 102 has an interface for receiving the sealing region. Moreover, the method 900 comprises a step of arranging 930 the sealing region in the interface, wherein the heat transfer unit 200 is arranged in the housing 102. Finally, the method 900 comprises a step of pressing 940 the housing 102 against the sheet 204 in order to connect the sheet 204 in a fluidtight manner to the housing 102 in the sealing region.

The illustrative embodiments described are chosen only by way of example and can be combined with one another.

It is furthermore particularly expedient if the housing is embodied in such a way that the heat exchanger can be inserted or installed separately as a cooler or, as an alternative, can also be embodied as an intake pipe or as an insert in an intake pipe and can thus be secured on the engine, preferably directly.

It is furthermore expedient if the following connections are used in order to be able to achieve a positive engagement between the housing parts and a seal between the fluids:

A sealing element seals the fluids axially or radially. Here, the sealing element can be a separate component or a molded-on seal.

The individual parts of the plastic housing are preferably connected by means of a welding or adhesive bonding process.

Alternatively, a groove/sealing joint for the plastic parts, including a mechanical joint, e.g. by means of a corrugated-slot bead on the housing, is provided to form a tube assembly.

Here, it is also possible to use a groove/sealing joint with screw fastening of the plastic parts.

The sheet can also be overmolded directly with plastic.

The seal can be made perforated at the circumference. If there is a leak between the sheet and the seal, the fluid from the leaking side can be passed to the outside through a perforation opening in the seal via the opening in the annular duct of the housing. There is no mixing of the fluids.

Predetermined leakage can also be provided in the housing between the two sealing surfaces.

The charge air connections can also be embodied as stubs or can have a flange connection, which is screwed to the engine for example.

It is advantageous if the coolant connections are molded directly into the plastic housing.

The covering can be adhesively bonded to the heat transfer unit matrix to increase strength.

The cover can be embodied with reinforcing beads.

Additional reinforcements, such as molded-in reinforcements made of metal or elements surrounding the housing increase strength levels.

A clearance angle on the cover in the region of the sheet and/or the seal allows friction-free insertion of the heat transfer unit matrix and of the seal into the housing until the seal is pressed down.

Two mutually independent sealing surfaces separate the two fluids in the sheet.

A gap between the housing and the tube broad side can be embodied as a coolant duct.

The coolant connection is provided via the housing and can be embodied in a flexible manner in the region of the heat transfer unit matrix through ducting of suitable design.

Soldered heat transfer unit matrix consisting of tubes and ribs, with or without sheets.

The charge air is carried in the tubes, and the cooling fluid is carried around the tubes.

The sheet can be embodied with a groove at the end, in which an air box is soldered on. The plastic housing then closes off only the coolant duct. One advantage of this solution is that no mixing of the fluids is possible and no plastic is used on the hot charge-air side.

Another embodiment according to the invention is to dispense completely with the sheet in the case of the coolant block, and to insert a soldered tube-rib assembly into the housing. By means of the housing, a separation is ensured between the charge-air and the coolant side since the housing has openings for the tubes and can thus form a sheet.

The invention claimed is:

1. A heat exchanger for controlling the temperature of a first fluid using a second fluid, wherein the heat exchanger has the following features:
   a sheet for separating the first fluid from the second fluid, said sheet comprising a sealing region;
   a partition for separating the first fluid from the second fluid, wherein the at least one partition is connected in a fluidtight manner to the sheet, wherein the at least one partition forms a fluid duct for the first fluid;
   a plurality of fluid ducts is arranged between two opposite sheets, and
   a housing having a groove in the sealing region, wherein the sheet is pressed in a fluidtight manner into the groove of the housing in the sealing region,
   a sealing element, which is arranged in the sealing region between the sheet and the housing, wherein the sealing element is pressed in a fluidtight manner against the sheet and against the housing,
   wherein the sheet comprises a peripheral chamfer in the sealing region.

2. The heat exchanger as claimed in claim 1, wherein the sheet and the housing each have, in the sealing region, at least one guide surface for positive connection of the sheet directly to the housing or indirectly to the housing by way of the sealing element.

3. The heat exchanger as claimed in claim 1, wherein the housing is formed as a single part.

4. The heat exchanger as claimed in claim 1, wherein charge air boxes are connected to the housing as inlet and outlet connections.

5. The heat exchanger as claimed in claim 4, wherein the housing and the charge air boxes surround the tubes and the sheets with positive engagement.

6. The heat exchanger as claimed in claim 4, wherein the housing and the charge air boxes are composed of plastic or metal.

7. The heat exchanger as claimed in claim 1, wherein the housing is an intake pipe of the engine.

8. The heat exchanger as claimed in claim 1, wherein the sealing element has at least one leakage opening for collecting and discharging leakage fluid.

9. The heat exchanger as claimed in claim 8, wherein the housing furthermore has a leakage duct for collecting and discharging leakage fluid in the sealing region.

10. The heat exchanger as claimed in claim 9, wherein the sheet furthermore has a drainage device for collecting and discharging leakage fluid in the sealing region.

11. The heat exchanger as claimed in claim 10, wherein the leakage opening and the leakage duct are designed to carry away leakage fluid from the leakage opening through the leakage duct.

12. The heat exchanger as claimed in claim 10, wherein the leakage opening and the drainage device are designed to carry away leakage fluid from the drainage device through the leakage opening.

13. A method for producing a heat exchanger for controlling the temperature of a first fluid using a second fluid according to claim 1, wherein the method has the following steps:
   supplying a heat transfer unit having at least one sheet for separating the first fluid from the second fluid, said sheet comprising a sealing region, and having a partition for separating the first fluid from the second fluid, wherein the at least one partition has been connected in a fluidtight manner to the sheet in a preceding connecting step, wherein the at least one partition forms a fluid duct for the first fluid;
   supplying a housing for surrounding the heat transfer unit, wherein the housing has an interface for receiving the sealing region;
   arranging the sealing region in the interface, wherein the heat transfer unit is arranged in the housing; and pressing the seal in a fluidtight manner between the housing and the sheet in order to separate the first fluid and the second fluid from one another.

14. The heat exchanger according to claim 1, further comprising a charge air box, wherein the sheet further comprises a groove, wherein a portion of the charge air box is accommodated in the groove of the sheet and a portion of the sheet is accommodated in the groove of the housing.

15. The heat exchanger as claimed in claim 1, wherein the housing is a housing of an air filter.

16. The heat exchanger as claimed in claim 2, wherein the at least one guide surface comprises the chamfer.

17. The heat exchanger according to claim 1, wherein the sealing element has an inner contour which mirrors an outer contour of the sheet including the chamfer, wherein the sealing element has an outer contour which mirrors an inner contour of the housing.

18. A heat exchanger for controlling the temperature of a first fluid using a second fluid, wherein the heat exchanger has the following features:
   a sheet for separating the first fluid from the second fluid, said sheet comprising a sealing region;
   a partition for separating the first fluid from the second fluid, wherein the at least one partition is connected in a fluidtight manner to the sheet, wherein the at least one partition forms a fluid duct for the first fluid;
   a plurality of fluid ducts is arranged between two opposite sheets, and
   a housing having a groove in the sealing region, wherein the sheet is pressed in a fluidtight manner into the groove of the housing in the sealing region,
   a sealing element, which is arranged in the sealing region between the sheet and the housing, wherein the sealing element is pressed in a fluidtight manner against the sheet and against the housing,
   wherein the sheet comprises a peripheral chamfer in the sealing region, wherein the sheet and the housing each have, in the sealing region, at least one guide surface for positive connection of the sheet directly to the housing or indirectly to the housing by way of the sealing element, wherein the at least one guide surface comprises the chamfer,
   wherein the sealing element has an inner contour which mirrors an outer contour of the sheet including the chamfer, wherein the sealing element has an outer contour which mirrors an inner contour of the housing
   wherein the sealing element has at least one leakage opening for collecting and discharging leakage fluid.

19. The method according to claim 13, wherein the pressing step comprises pressing the sheet into the groove of the housing.

20. The method according to claim 13, wherein the pressing step comprises pressing the groove of the housing onto the sheet.

* * * * *